United States Patent [19]

Gentile et al.

[11] Patent Number: 5,335,060
[45] Date of Patent: Aug. 2, 1994

[54] IMAGE INTENSITY DEGRADATION TESTER

[75] Inventors: Geoffrey E. Gentile, Hammonton, N.J.; Bruce D. Oestreich, Media, Pa.

[73] Assignees: The Boeing Company, Seattle, Wash.; Bell Helicopter Textron, Inc., Fort Worth, Tex.

[21] Appl. No.: 994,484

[22] Filed: Dec. 21, 1992

Related U.S. Application Data

[63] Continuation of Ser. No. 252,489, Sep. 30, 1988, abandoned.

[51] Int. Cl.[5] ............................................. G01D 18/00
[52] U.S. Cl. .................................. 356/213; 250/252.1
[58] Field of Search ............... 356/213, 432, 433, 213, 356/432, 433; 351/243, 239; 250/205, 252.1 A

[56] References Cited

U.S. PATENT DOCUMENTS

| | | | |
|---|---|---|---|
| 806,392 | 12/1905 | Bolton | 356/213 |
| 2,186,408 | 1/1942 | Feldman | 351/243 |
| 2,313,240 | 3/1943 | Hubbard | 351/243 |
| 2,364,793 | 12/1944 | Jobe et al. | 351/243 |
| 3,431,464 | 3/1969 | Brischnik | 250/205 |
| 3,522,464 | 8/1970 | Fougere | 313/117 |
| 3,532,434 | 10/1970 | Jones et al. | 250/205 |
| 4,309,608 | 1/1982 | Adamson, Jr. et al. | 250/330 |
| 4,516,852 | 5/1985 | Liu et al. | 356/121 |
| 4,615,594 | 10/1986 | Task | 351/239 |
| 4,728,188 | 3/1988 | Kitagawa et al. | 356/218 |

OTHER PUBLICATIONS

Taylor, D. G., "The Minimum Brightness Gain Required by Viewers Using Image Intensifiers", *Optica Acta*, vol. 19, No. 5 (1972) pp. 421–424.

*Primary Examiner*—Richard A. Rosenberger
*Attorney, Agent, or Firm*—Jones, Tullar & Cooper

[57] ABSTRACT

A tester for image intensifier tubes used in night vision goggles used by aircraft crew members includes a photosensor, dc. power supply, lamp, optical filter, neutral density optical filters, feedback control, and columnating lens. The intensity of the lamp is controlled with reference to the magnitude of an electrical variable that changes with the intensity of light produced by the lamp. A differential amplifier having a constant current bridge circuit varies base current to cascaded transistor amplifiers in accordance with changes in the electrical variable. The bridge and amplifier stages stabilize the intensity of light produced by the lamp. An array of optic filters of graduated intensity shows the intensity of light in a range of wavelengths near infrared able to pass through an ANVIS filter.

5 Claims, 3 Drawing Sheets

IMAGE INTENSITY DEGRADATION TESTER

This is a continuation of co-pending application Ser. No. 07/252,489, filed on Sep. 30, 1988, now abandoned.

BACKGROUND OF THE INVENTION

1. Field of the Invention

This invention relates to the field of night vision optics. More particularly, the invention pertains to testing for insidious degradation in intensity of images seen through night vision goggles of the type used by aviators.

2. Description of the Prior Art

To see at night images located outside an aircraft, aviators use night vision goggles. To see instrument dials located in the cockpit, some illumination in the cockpit is necessary. However, in former night vision systems, if cockpit illumination were intense enough to permit viewing instrument dials at night, it reduced or prevented clear external vision through the goggles. In using former systems, when cockpit light was reduced enough to permit clear external night vision through the goggles, cockpit instruments could not be seen unless the goggles were removed.

To overcome this difficulty and permit acceptable internal and external vision, now filters are used to view external images and colored light, having wavelengths corresponding to a portion of the visible spectrum, is used within the cockpit.

Light from the night sky is known to have wavelengths in the visible range near that of infrared. Accordingly, the aircraft crew now wear goggles at night having a filter through which external images are viewed. The filter passes light having wavelengths in the visible spectrum corresponding to that of light from the night sky and blocks light having shorter wavelengths. Therefore, blue, green, and even yellow light is invisible through the filter. A filter having this capability is part of the Aviator Night Vision System known as ANVIS.

SUMMARY OF THE INVENTION

Image intensifier tubes used in aviation night vision goggles degrade slowly, imperceptibly with passage of time and exposure to sunlight radiation without notice or warning. When this gradual decline has advanced sufficiently, the aviator becomes unable to see images outside the aircraft when lighted solely by natural, ambient light from the night sky.

The tester according to this invention permits a pilot to check the ability of night vision goggles to pass light of sufficient intensity for safe night flight. The tester is portable and sufficiently accurate for use by aircraft crew members in the cockpit before night flight is attempted. The tester contains a graduated scale of light intensity visible to the observer. It provides a measure of the current condition of the goggles. Furthermore, the tester indicates, with reference to a graduated scale of visible light intensity, whether night flight should be attempted at all with night vision goggles under test in their current condition.

These advantages over the current state of night vision optics are realized by practicing the testing method and using the tester according to this invention, which includes a photosensor, dc. power supply, lamp, optical filter, neutral density optical filters, feedback control, and columnating lens. The intensity of the lamp is controlled with reference to the magnitude of an electrical variable that changes with the intensity of light produced by the lamp. A differential amplifier having a constant current bridge circuit varies base current to cascaded transistor amplifiers in accordance with changes in the electrical variable. The bridge and amplifier stages stabilize the intensity of light produced by the lamp. An array of optic filters of graduated intensity shows the intensity of light in a range of wavelengths near infrared able to pass through an ANVIS filter.

DESCRIPTION OF THE PREFERRED EMBODIMENT

Figure 1:
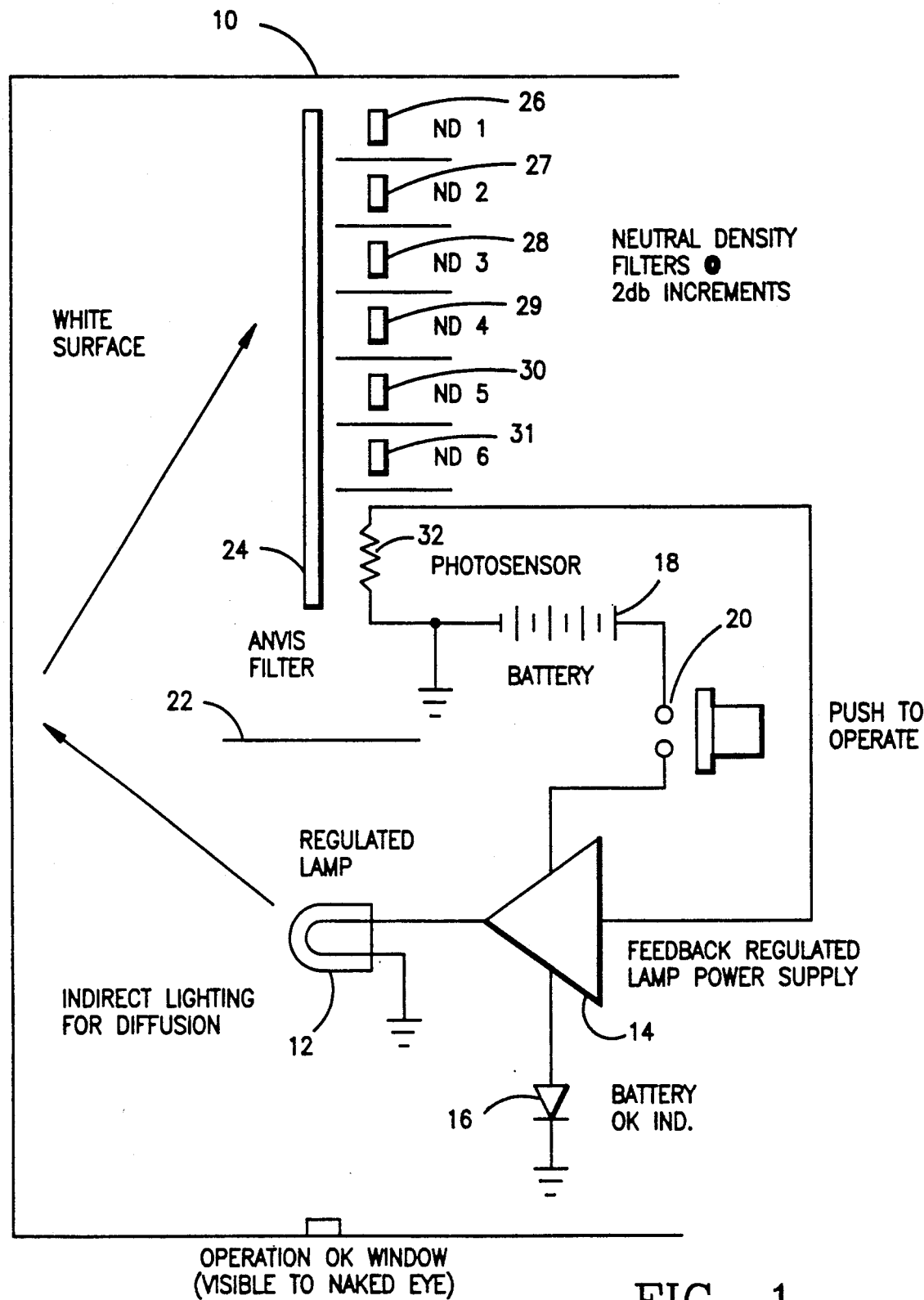
FIG. 1 is schematic block diagram of a stabilized light source, filters, photosensor, and differential amplifier arranged according to this invention.

Referring to the diagram of FIG. 1, the components are contained in a casing 10, whose interior is painted white. A lamp 12, connected to ground, is supplied with electric current from a feedback-regulated lamp power supply 14, which also drives a battery indicator 16 in the form of a green light emitting diode LED. A d.c. power supply or battery 18 is connected to ground and to the feedback control through a spring loaded normally open switch 20, which is closed by the operator or observer when the tester is in use.

A diffuser or baffle 22 is located between the light source and an ANVIS optical filter 24 able to pass light having wavelengths in the visible spectrum near infrared, and to block light having shorter wavelengths. Generally, blue, green, and even yellow light is invisible through the filter. Located behind filter 24 is an array of neutral density optical filters 26–31 for passing light at different levels of intensity in a graduated scale of intensity, perhaps at 2 db increments one from another. The range of light intensity passed by the filter array has at one extremity an intensity corresponding to, or close to, a minimum or unacceptable level for night vision.

A photosensor 32, located behind the ANVIS filter 24 adjacent the filter array, is connected to the power supply and is connected to the feedback control. The photosensor may be a photoresistor whose conductivity increases with an increase in intensity of radiation falling on the photoresistor and whose conductivity decreases as radiation decreases. Acceptable commercially available photoresistors change resistance by several kilohms for a light intensity change of 100 foot-candles. Alternatively a photodiode may be used.

Figure 2:
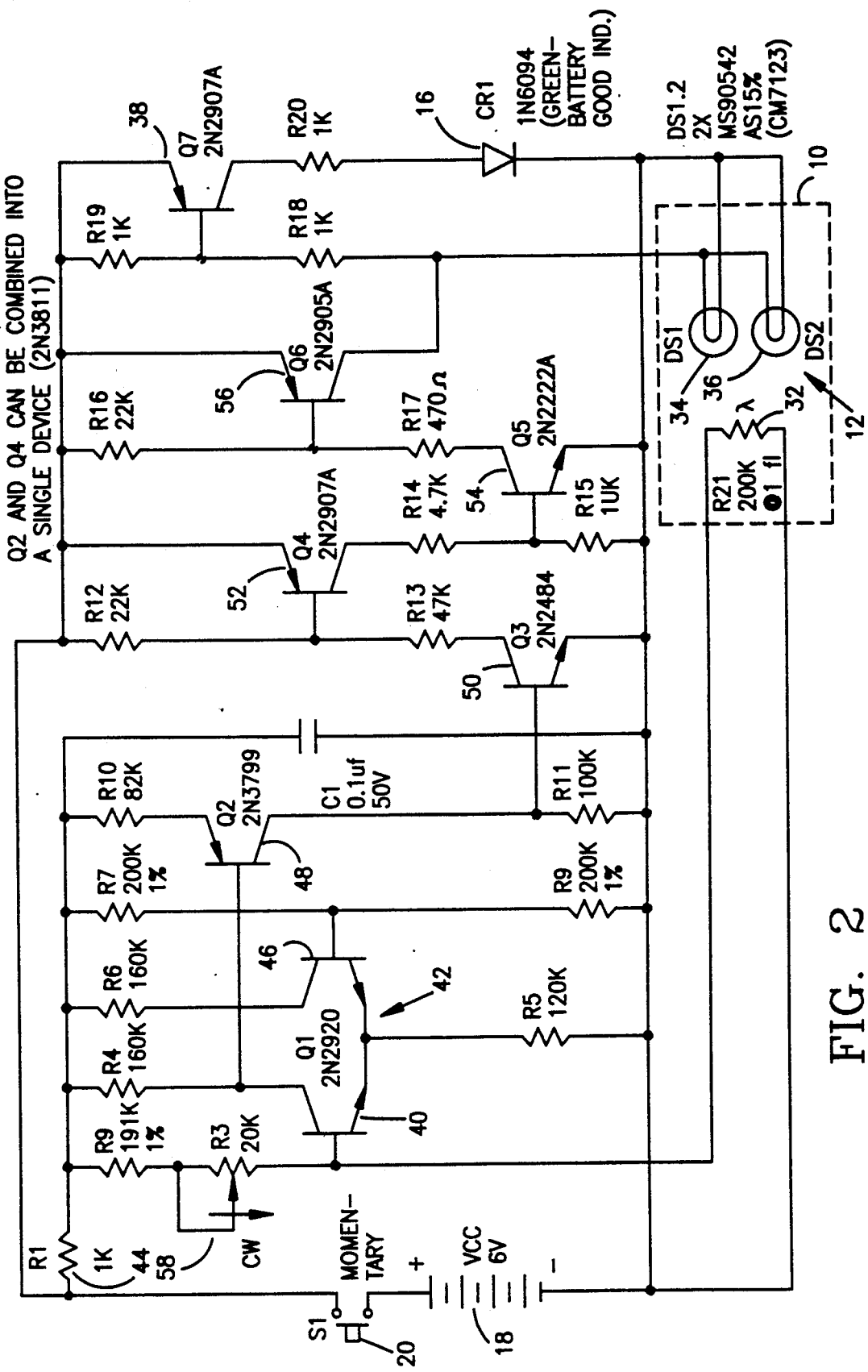
FIG. 2 is a diagram of a feedback control circuit, photosensor, and stabilized light source.

The intensity of light produced by lamp 12 is controlled by the differential amplifier of FIG. 2. Two lamps 34, 36 are driven alternately by transistor 38 so that, if one lamp should fail, the other will function. Each lamp produces 1 foot-lambert when the resistance of the photoresistor is 200K. LED 16 conducts and produces a visible indication of acceptable battery function when either of the lamps is lighted.

The voltage drop across photoresistor 32 affects the magnitude of current to the base of transistor 40 on the left-hand side of current bridge 42. Resistor 44 isolates the amplifier portion of the circuit from the rest of the circuit so that fluctuations in current through the lamps cannot induce oscillations and adversely affect feedback control.

If light intensity produced by a lamp increases, conductivity of resistor 32 increases, its resistance falls, and the transistor tends to saturate. This cuts off current through transistor 40 and directs current through transistor 46, because total current through the current bridge must remain constant. This increases the base current of transistor 48 and has a similar cascade effect on the other transistors. In this way, current through transistors 48, 50, 52, 54, and 56, which are arranged in the form of cascaded transistor stages, is cut back. Therefore, the intensity of light produced is reduced and stabilized.

If the lamps dim, resistance of the photosensor and current to the base of transistor 40 increase. Current to the base of transistor decreases 46, in order that current through bridge 42 is maintained constant. Then transistors 48, 50, 52, 54 and 56 conduct more current. This raises the intensity of the light produced by the lamp and tends to stablize the light source. If the gain of the cascaded stages is insufficient, additional amplifier stages can be added.

If transistor 56 saturates, transistor 38 shuts off battery indicator diode 16. If the voltage drop across a lamp is 4 volts, transistor 38 turns off. Variable resistor 58 permits the intensity of the light produced by a lamp to be calibrated accurately in a lab before field use.

Figure 3:
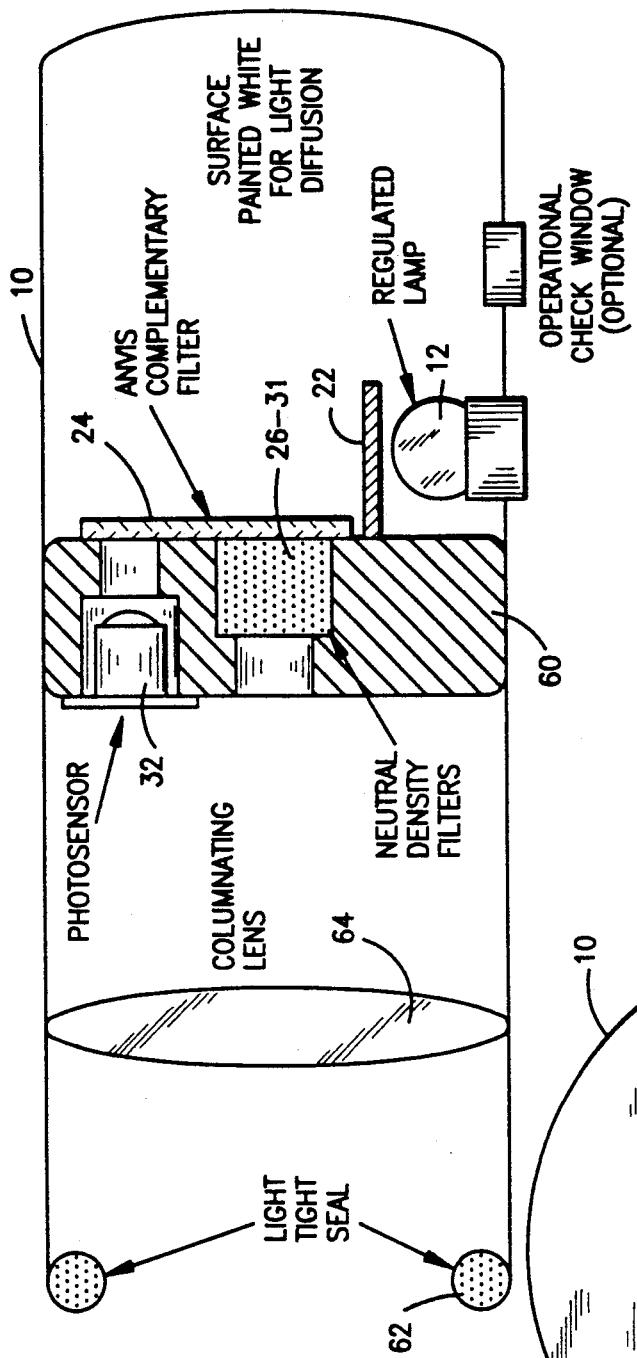
FIG. 3 is a cross section through the tester having the components arranged for use by an observer viewing the filter array through a columnating lens from the left-hand side.

The tester components can be arranged as shown in FIG. 3. A plate 60, located within casing 10, the interior of which is painted white, supports photosensor 32 and a graduated array of neutral density filters 26–31. The array is distributed along a line in order of the intensity of the light each filter will pass. The ANVIS filter is mounted on the plate immediately before the photosensor and filter array, between lamp 12 and its baffle 22. Light-tight gaskets 62 located around the eyepiece seal the interior of the casing against passage of light when the eyepiece is held against the exterior of the night vision goggles worn by the observer.

A columnating lens 64, a convex lens mounted on the interior of the casing between the eyepiece and the outer side of plate 60, locates at infinity the focal plane of the image seen through the neutral density filter array.

Figure 4:
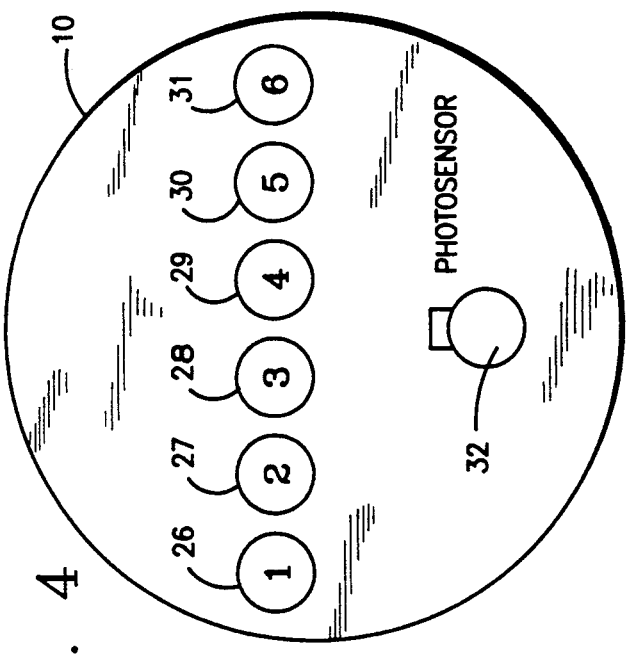
FIG. 4 is the reticle in the focus of the eyepiece of the tester as viewed through the columnating lens from the left-hand side of FIG. 3.

FIG. 4 shows that the image seen by the observer is a reticle containing spot sources of light in graduated intensity from high to low, preferably numbered for reference.

As the image intensifier tube of the night vision goggles degrades, the graduated light scale seen through lens 64 (FIG. 3) indicates the degree of degradation to the observer. For example, if each of the six spots of light are seen in the reticle, the observer learns that the goggles are able to pass light of sufficient intensity for safe night vision. To the extent that a lesser number of light spots are seen in the reticle, the indicated degree of degradation increases. The number of light spots seen in the reticle can be correlated with an acceptable degree of degradation.

What is claimed is:

1. A device for testing intensity of light comprising:
   a light source;
   a first optical filter able to pass light having wavelengths in the visible spectrum near infrared and to block passage of light having shorter wavelengths;
   photosensor means exposed to light from the light source that passes through the first optical filter for producing an electrical control variable whose magnitude changes with the intensity of light passing through the first optical filter;
   feedback control means responsive to the magnitude of the electrical control variable for maintaining substantially constant the intensity of light from the light source; and
   an array of neutral density optical filters exposed to light from the first optical filter, each neutral density optical filter of the array being able to pass light of different intensity than other neutral density optical filters of the array, thereby producing a graduated scale of light intensity, wherein the feedback control means comprises:
   an emitter-coupled differential amplifier including a current bridge carrying current from a power source through the photosensor means;
   cascaded amplifier stages having control current connected to the current bridge;
   means for changing control current in the cascaded amplifier stages in response to changes in magnitude of the electrical control variable of the photosensor means; and
   means for changing the voltage drop across the light source in response to control current changes in the cascaded amplifier stages.

2. The device of claim 1, further comprising a columnating lens means located between the array and an observer for locating the focal plane of the array at infinity.

3. The device of claim 1, wherein the photosensor means is a photoresistor whose electrical conductivity increases with an increase in radiation falling on the photoresistor, and whose conductivity decreases with a decrease in radiation.

4. The device of claim 1, further comprising:
   an electrical power source; and
   means for producing a visible indication of an acceptable level of capacity of the power source.

5. In combination, night vision goggles including optical filter means for passing light having wavelengths in the visible spectrum corresponding to that of light from the night sky, and a device for testing the ability of the night vision goggles to pass light of sufficient intensity, said device comprising:
   a light source;
   a first optical filter able to pass light having wavelengths in the visible spectrum near infrared and to block passage of light having shorter wavelengths;
   photosensor means exposed to light from the light source that passes through the first optical filter for producing an electrical control variable whose magnitude changes with the intensity of light passing through the first optical filter;
   feedback control means responsive to the magnitude of the electrical control variable for maintaining substantially constant the intensity of light from the light source; and
   an array of neutral density optical filters exposed to light from the first optical filter, each neutral density filter of the array being able to pass light of different intensity than other neutral density optical filters of the array, thereby producing a graduated scale of light intensity, wherein the feedback control means comprises:
an emitter-coupled differential amplifier including a current bridge carrying current from a power source through the photosensor means;
cascaded amplifier stages having control current connected to the current bridge;
means for changing control current in the cascaded amplifier stages in response to changes in magnitude of the electrical control variable of the photosensor means; and
means for changing the voltage drop across the light source in response to control current changes in the cascaded amplifier stages.

* * * * *